July 14, 1925.

C. BLACK ET AL 1,545,544

MACHINE FOR COPYING SHOE LASTS AND OTHER IRREGULAR BODIES

Original Filed Aug. 6, 1923    5 Sheets-Sheet 1

C. BLACK ET AL 1,545,544

MACHINE FOR COPYING SHOE LASTS AND OTHER IRREGULAR BODIES

Original Filed Aug. 6, 1923   5 Sheets-Sheet 2

INVENTORS
Carl Black
Carl Bonscheidt, Jr.
By their Attorney
Nelson W. Howard

July 14, 1925.

C. BLACK ET AL

1,545,544

MACHINE FOR COPYING SHOE LASTS AND OTHER IRREGULAR BODIES

Original Filed Aug. 6, 1923  5 Sheets-Sheet 3

July 14, 1925.

C. BLACK ET AL 1,545,544

MACHINE FOR COPYING SHOE LASTS AND OTHER IRREGULAR BODIES

Original Filed Aug. 6, 1923   5 Sheets-Sheet 4

INVENTORS

July 14, 1925.
C. BLACK ET AL
1,545,544
MACHINE FOR COPYING SHOE LASTS AND OTHER IRREGULAR BODIES
Original Filed Aug. 6, 1923   5 Sheets-Sheet 5

INVENTORS
Carl Black
Carl Benscheidt Jr.
By their Attorney,
Nelson W. Howard

Patented July 14, 1925.

UNITED STATES PATENT OFFICE.

CARL BLACK, OF MONKSBERG, AND CARL BENSCHEIDT, JR., OF ALFELD ON THE LEINE, GERMANY, ASSIGNORS TO UNITED SHOE MACHINERY CORPORATION, OF PATERSON, NEW JERSEY, A CORPORATION OF NEW JERSEY.

MACHINE FOR COPYING SHOE LASTS AND OTHER IRREGULAR BODIES.

Original application filed August 6, 1923, Serial No. 656,142. Divided and this application filed December 19, 1924. Serial No. 757,058.

*To all whom it may concern:*

Be it known that we, CARL BLACK and CARL BENSCHEIDT, Jr., citizens of Germany, residing, respectively, at Monksberg and Alfeld on the Leine, Germany, have invented certain Improvements in Machines for Copying Shoe Lasts and Other Irregular Bodies (for which we have filed an application in Germany, July 27, 1922, No. R. 56,445), of which the following description in connection with the accompanying drawings is a specification, like reference characters on the drawings indicating like parts in the several figures.

This invention relates to pattern copying lathes and is disclosed in connection with a lathe for turning shoe lasts of the type set forth in United States Letters Patent No. 544,891, granted Aug. 20, 1895, on application of W. F. Gilman, and this application is a division of our application bearing the filing date of August 6, 1923, Serial No. 656,142.

An object of the invention is to provide an improved width grading mechanism. Heretofore, in machines of the type above referred to, this mechanism has comprised a link or connecting rod extending from an oscillating frame carrying the model and block to a width grading fan-board, which resulted in inaccuracy in grading due to the finite length of the connecting link. The present invention corrects this difficulty by connecting the oscillating frame and the fan-board by a rectilinearly sliding rod, which accurately preserves the pantographic nature of the reproduction.

Another difficulty that has been experienced with width graders is that, due to the practice of width grading at the rate of ¼ inch per size irrespective of the model girth, the pantographic grading factors (and consequently the settings of the grading mechanism) are different for every model. The setting scale provided with last lathes has had no definite relation to the work to be done by the machine, and the setting of the width grader has to be learned by trial, and varies among different machines of the same make. Consequently, an object of the present invention is to provide a universal setting scale for the width grader, which will indicate accurately and directly the performance to be expected from the machine.

To this end, an important feature of the invention consists in a setting apparatus comprising two direct reading scales, one relating to the model girth and the other to the alteration in girth desired, and a pointer co-operating with both scales to effect the proper grader setting. A difficulty has been heretofore present in the length grading mechanism of machines of the illustrated type in that the length grading lever has been pivoted on the model wheel carriage, and connected by a link to the cutter carriage. The finite length of this link as in the width grader causes a similar failure of exact pantographic reproduction. The present invention meets this difficulty by a rectilinearly sliding link between the grading lever and the cutter carriage.

These and other features of the invention comprising certain combinations and arrangements of parts will be understood from the following description of a preferred embodiment thereof selected for purposes of illustration and shown in the accompanying drawings in which,
Figs. 18 and 19ª are details of a third form of model drive;

Figure 1:
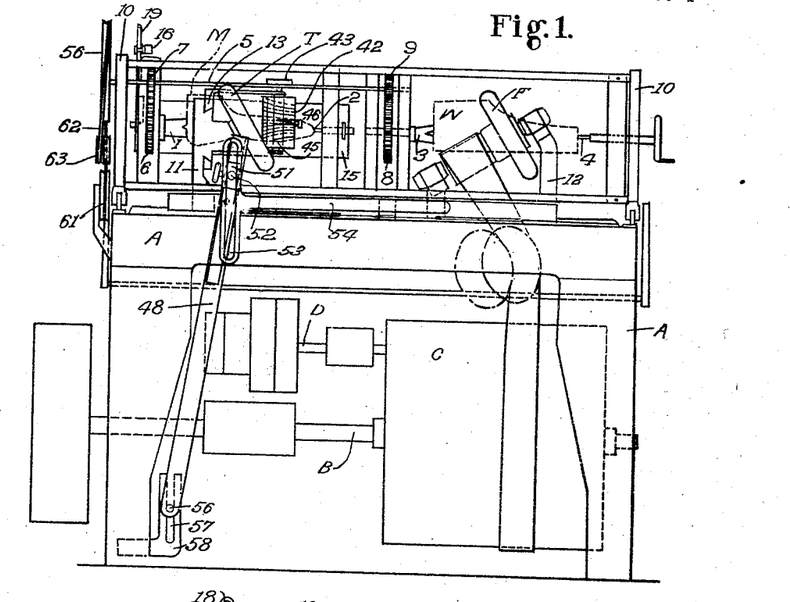
Figure 1 is a front elevation.
Figure 2:
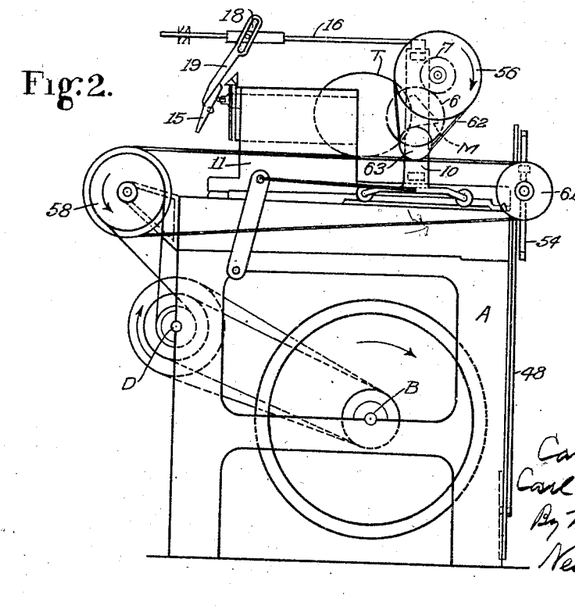
Figure 2 is a left-hand side elevation.

Referring to Figs. 1 and 2, which show the complete machine, the last W is cut from a pattern M, commonly termed a "model", by means of a high-speed milling head or cutter F. The pattern M is secured between dogs 1, 2, the work between dogs 3 and 4, and both are uniformly rotated from a shaft 5 by gearing 6, 7 and 8, 9. Their axes of rotation are collinear, as is well known. If it is desired to produce from a right pattern a left last, the direction of rotation of the wood block M is made opposite to the direction of rotation of the pattern by cutting in to the drive of one or the other a reversing gear, in the usual manner. The two supporting devices for the pattern and the work are secured in a carriage 10, which is capable of moving on a rectilinear slide upon the frame A in a direction at right angles to the axis of pattern and work. The pattern M is pressed against a rotary model wheel T by a spring or weight, so that the pattern M and the wheel T determine the position of the carriage 10 upon the frame of the machine and thereby the distance of the axis of the work W from the milling cutter F. This distance thus varies constantly as the pattern rolls upon the model wheel T and thereby the shape cut out of the wood block W is controlled. The model wheel T and the milling cutter F are mounted on carriages 11 and 12 which are adapted to move parallel to the axis of rotation of the model and work. The travel of one of the carriages, as 11, is effected in any convenient manner from the machine as by a screw spindle. The other carriage 12 is connected with the carriage 11 by the length grading device and according to the adjustment of this grading device can move faster, with the same speed as or slower than the carriage 11, if the work, the last, should be longer than, of the same length as, or shorter than the pattern, respectively. The grading for different widths is effected by moving a sliding carriage 13 supporting the model wheel T at right angles to the axis of rotation of the pattern M, and parallel to the sliding movement of the carriage 10 so that the carriage 10 is displaced by the model more or less in accordance with the radial dimensions of the pattern. Thus the cutter F and model wheel T are moved transversely of their axes in relation to each other.

The machine is driven from a main shaft or first motion shaft B, which is journaled in the frame A of the machine and drives the milling cutter F by means of a belt drum C and the shaft 5 by means of a counter shaft D.

Figure 3:
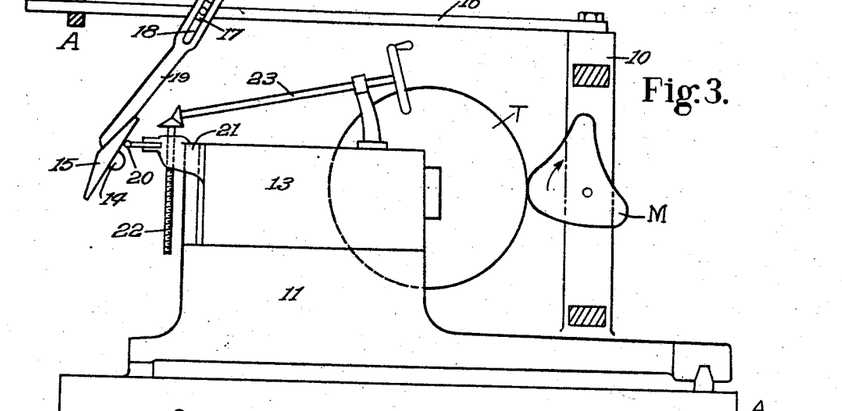
Fig. 3 is a detail of the width grading mechanism.
Figures 4, 5, 6:
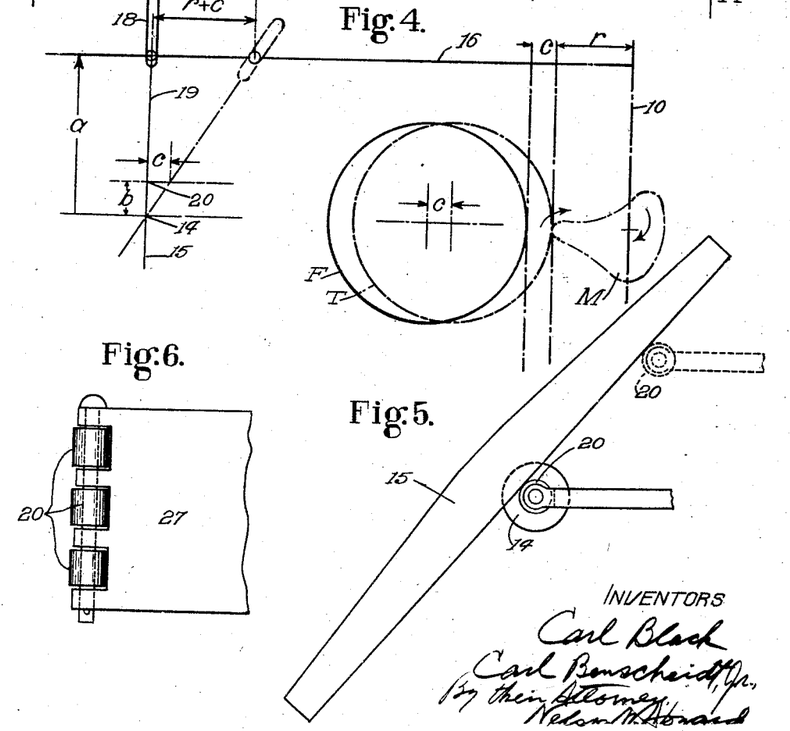
Fig. 4 is a diagram of the width grading mechanism.
Figs. 5 and 6 are details of the width grading mechanism.

The width grading device shown in Figs. 3-12 will now be described. Fig. 3 illustrates the actual construction and Fig. 4 shows diagrammatically the manner of its operation. When the pattern M rotates in the direction of the arrow, Fig. 3, the carriage 10 supporting the pattern moves toward the left in correspondence with the reduction of the radial distance of the point of contact between the pattern M and the model wheel T. This movement is followed by the work, not illustrated in this figure, so that the milling cutter takes an increasing cut from the work block.

If it is desired that the last should have a larger width, that is, larger radial dimensions, than the pattern M, an additional motion is imparted to the carriage 13, which forces the carriage 10 toward the right. This additional motion must have a certain relation to the radius of the work and become greater when the radius increases and is thus made dependent upon the motion of the carriage 10. The motion of the carriage 13 is effected by a lever or fan-board 15, which is given the shape of a flat plate, adapted to swing around the stationary axis 14, which lever presses against a feeler 20 upon the carriage 13. Heretofore the fan-board 15 has been connected with the carriage 10 by an articulated link. The feeler 20, with which this fan-board is in contact, can be adjusted vertically. If this feeler is situated a long distance above the axis 14, the carriage 10 when receding a considerable distance as in passing a comparatively thick piece of the pattern 11 causes a correspondingly long travel of the carriage 13 toward the right, by which the carriage 10 is moved a corresponding distance still farther to the right than it would go in 1:1 reproduction, as required for the enlargement of the work. In this construction no rigorously exact proportionality exists between the radius of the pattern and the desired additional movement, owing to the finite length of the connecting rod, and the swinging movement of its end where connected to the fan-board.

According to this invention, the carriage 10 is connected with the fan-board 15 by a rod 16 guided for rectilinear movement in the machine frame A, by means of a link block 17 guided in a slot 18 of an arm 19 fixed upon the fan-board 15. Against the fan-board 15 abuts a roll 20 fixed in a bracket 21 adapted to be vertically adjusted upon the carriage 13. This bracket can be moved vertically in relation to the axis of rotation of the fan-board 15 by means of a screw spindle 22 connected by bevel gearing with a rod 23 provided with a handle at its end. The plane of contact between the fan-board and the roll 20 is set back of the geometrical axis of the shaft 14 by a distance equal to the radius of the roll. The pivot of the link block is in line with the axes of the shaft 14 and roll 20. This arrangement is shown on a larger scale in Figs. 5 and 6, and offers, compared with the hitherto customary arrangement, in which the fan-board is pressed against a knife edge or point on the bracket 21, the advantage that the otherwise unavoidable uneven wear and tear is greatly reduced and an accurate grading is rendered possible.

The effect of this arrangement is clearly illustrated in the diagrammatic representation shown in Fig. 4.

The effective length of the rod 16 and the distance from the roll 20 to the model wheel T are such that when the fan-board is vertical, the collinear axes of rotation of the model and work will fall on the faces of the model wheel and cutter respectively. If now the roll 20 be moved to a distance $b$ above the axis of rotation 14, and the model allowed to rest against the face of the model wheel, we shall have the following condition of things:—

If $r$ be the model radius, and $c$ be the distance the model wheel and roll 20 have been moved forward by the link 16 and the fan-board rotation, the total distance the frame 10 has been moved out from the face of the cutter is $r+c$, and this is the depth of cut on the work. The link block 17 will also have been moved forward this same distance $r+c$. If $g$ is the grading factor, the radius being cut on the work will be $gr=r+c$. The quantity $c$ must therefore be $gr-r$, the difference between the work and model radii. From the similar triangles at the left we have $$\frac{r+c}{r}=\frac{a}{b}=\frac{gr}{gr-r}=\frac{g}{g-1} \quad (1)$$

whence $$g=\frac{a}{a-b} \quad (2)$$

$$b=a\left(1-\frac{1}{g}\right) \quad (3)$$

Thus, $g$ is a constant, independent of $r$, so that all radii of the model are magnified in the same proportion.

If the fan-board roll 20 is moved downwards beyond the shaft 14 a corresponding reduction of the radial dimensions is produced, while when the axis of the roll coincides with the axis of rotation of the fan-board, no grading movement is given to the model wheel, and pattern and last become equal. During the movement of the model wheel along the pattern, the roll 20 is carried longitudinally along the fan-board.

Figure 7:
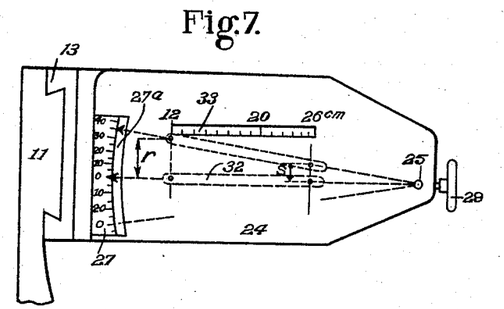
Figs. 7 and 8 are details of the width grading setting mechanism.
Figure 8:
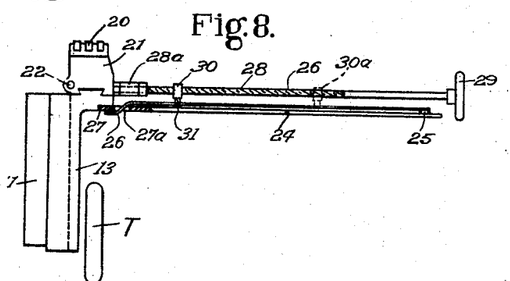

The "width" of a last refers to its perimeter measured at a certain standard place, for example, the instep where the women's standard 4B model measures 8 inches. Lasts are width graded a uniform amount per size, in length and width combined; that is, if the 4C measures 8¼ inches etc., the 5B will measure 8¼ inches, the 5C, 8½ inches, etc. It will be obvious from (3) that uniform increases in $g$ will not result in uniform increases in $b$, the differences in $b$ becoming smaller and smaller as $g$ increases by uniform amounts. Further, the quantity $g$ itself depends on the perimeter of the model being used, as well as on the number of sizes and grade required. To enable the required adjustment of the fan-board roll to be made quickly and accurately for any desired enlargement or reduction of the width of the last for any width of pattern, an indicating device is provided by the present invention, a construction of which is shown in Figs. 7 and 8, in side elevation and plan.

Referring to these figures it will be seen that a plate 24 is mounted upon the transverse carriage or slide 13 upon which plate 24 a pointer or lever 26 is fulcrumed at the point 25. This pointer is pivoted on the back of the plate 24 and its indicating end extends through a slot 27$^a$ to the front of the plate 24. The end of the pointer plays along a scale 27 on the plate 24, which from a zero point, at which the pointer 26 is in a horizontal position, is provided with graduations at both sides at variable distances apart, as determined by the help of formula (3), in such a manner that each dividing line indicates an amount by which the last should be made wider or narrower than the pattern.

On the bracket 21 which is vertically adjustable on the carriage 13 by the screw spindle 22, a screw spindle 28 is journaled at an unthreaded portion 28$^a$ at its end. This spindle is adapted to be rotated by a hand wheel 29 and carries a nut 30, which by means of a pin 31 engages a slot 32 of the lever 26. By turning the hand wheel or knob 29, this pin may be moved along in the slot and its position is indicated upon a scale 33 which shows in accordance with the metric system in use in the inventors' country the usual pattern widths or girths, for instance from 12 to 26 cm.

If the pin 31 is moved far towards the left from the fulcrum 25 of the pointer 26, the bracket 21 with the fan-board roll must be moved by the distance $r$, in order to give a certain deflection of the pointer upon the scale 27, for instance 35 mm. In this position of the fan-board roll a last of the small girth, 12 cm, is to be enlarged by 35 mm. If the pin 31 is moved towards the other end of the scale 33, as shown in dotted lines at 30$^a$, the bracket need only be moved by the considerably smaller distance $s$, in order to cause the same deflection up the scale 27. The scale 33 is so divided, that in this position of the pin 31 the large last of 26 cm girth is also enlarged by 35 mm.

By adjusting the pin 31 for the width of the last pattern and by moving the bracket 21 until the pointer 26 indicates the desired change of the width of the last, the lathe may at once and without calculations and tests be so adjusted that very approximately the desired alterations are made in the last to be produced.

The plate 24 does not move vertically, but the bracket 21, bearing 28ª, screw 28, nut 30 and pin 31 do so move, and the lever 26 is moved by the pin 31, the advantage of the lever changing with the horizontal adjustment of the pin 31, to make the movement of the indicating end of the lever along the scale 27 correspond to the model girth, as indicated by the pin 31 along the scale 33.

Figure 9:
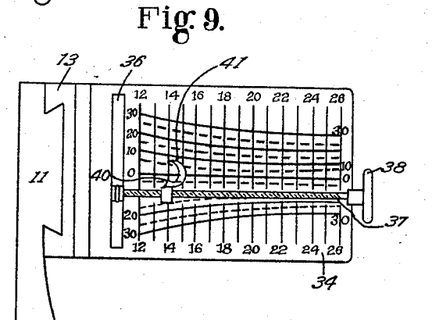
Figs. 9 and 10 are details of a second form of setting mechanism.
Figure 10:
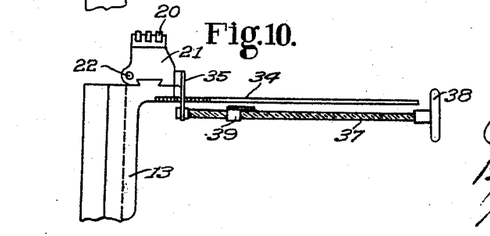

In the second illustrated indicating device shown in Figs. 9 and 10, a plate 34 is mounted upon the transverse slide 13, upon which a number of curves are drawn. Upon the bracket 21 is journaled a screw spindle 37 by means of an arm 35, which passes through a slot 36, which screw spindle is provided with a hand wheel 38 and the nut 39 riding upon it is provided with two pointers 40, 41, one of which is directed vertically upwards and the other horizontally. The abscissæ of the curves correspond to the widths of the patterns, while the ordinates represent above and below the zero line the calculated distances by which the bracket 21 must be moved in order to produce a certain enlargement or reduction of the width. If the nut 39 is moved horizontally until the point 40 stands on the abscissa corresponding with the width of the model and then the bracket 21 is adjusted vertically until the finger 41 stands on the curve which indicates the number of mm by which the last should be wider or narrower than the model, the fan-board roll then has the correct adjustment.

Figure 11:
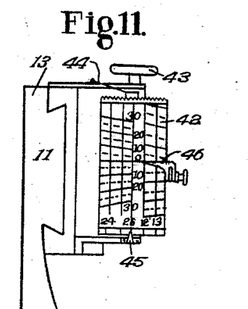
Fig. 11 and 12 are details of a third form of setting mechanism.
Figure 12:
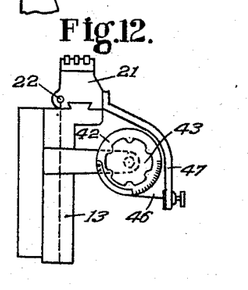

In the third construction illustrated in Figs. 11 and 12, a similar table of curves is employed as in the just-described case, but this table is mounted on a drum 42, journaled upon the transverse slide 13 and adapted to be turned by a knob or hand wheel 43. A pawl 44 consisting of a flat spring engaging a toothed crown upon the upper end of the drum maintains the drum in the position for which it has been adjusted. A pointer 45 upon the slide 13 is adjusted upon the abscissæ of these curves designated with the model widths, while a pointer 46, which is mounted by an arm 47 on the bracket 21, can be adjusted upon the ordinates of the curves by turning the screw spindle 22. Adjusting the drum in relation to the pointer 45 until this pointer points at the width of the pattern, and raising and lowering the pointer 46 until it stands on the curve which indicates the desired alteration, gives at once the desired adjustment of the lathe. The devices shown in Figs. 9-12 are rigorously accurate.

Figure 13:
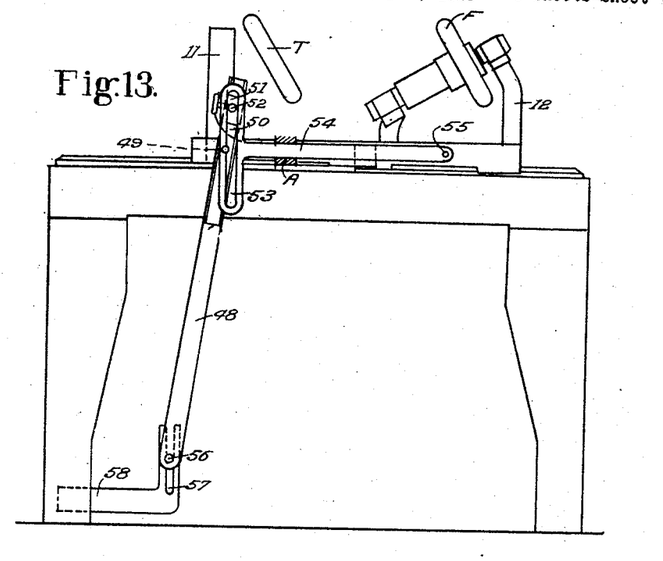
Fig. 13 is a detail of the length grading mechanism.
Figure 14:
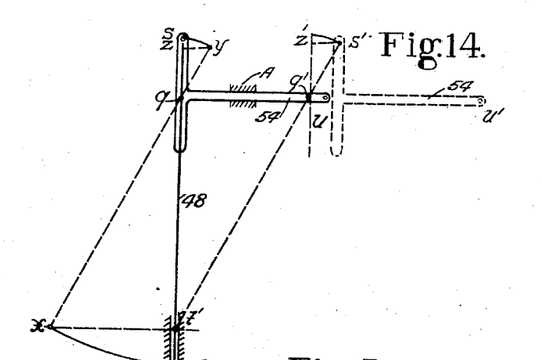
Fig. 14 is a diagram of the length grading mechanism.
Figure 15:
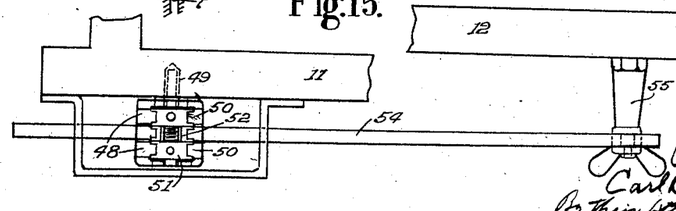
Fig. 15 is a detail in plan of the length grading mechanism.

The device for effecting the length grading is shown in Figs. 13-15. The alteration of the length of the last compared with the pattern is effected by a relative displacement of the carriage 12 in relation to the carriage 11, while they are fed along the axis of rotation of the pattern and the work. In the lathes heretofore in use the carriage 12 is pivotally connected by a link with a lever, the fulcrum of which is situated upon the carriage 11 and the lower end of which is guided by a slot along a stationary point upon the frame. The point of connection between this link and the lever is adapted to be moved in the longitudinal direction of the lever to either side of the fulcrum. If the point of connection coincides with the fulcrum no alteration of the length of the work compared with the pattern takes place, while when this point is moved upwards an enlargement, and when it is moved downwards a reduction, takes place. In both cases, the alteration is, however, not strictly proportional, owing to the finite length of the connecting link.

In order to render the movement of the carriage 12 accurately proportional to the carriage 11, the transmission of motion from one carriage to the other is effected according to the present invention by a rectilinearly guided slotted link and pin. The lever 48 is connected with the carriage 11 by a pin 49 and is furnished with a guide 50, in which a link block 51 is adjustable. This link block is fitted with a pin 52, which engages a vertical slot 53 in the link 54. The latter is guided horizontally and adjustably connected with the carriage 12 by a pin 55. The lower end of the lever 48 is fitted with a pin 56, which engages a slot 57 in a bracket 58 mounted upon the frame A of the machine.

The manner of operation of this device is indicated in Fig. 14. The lever 48 is adapted to swing around the fulcrum $q$ (the pin 49 in the model wheel carriage). The point $t$ (the pin 56) and the point $s$ (the pin 52) are mounted on the lever, the latter adjustable. If the model wheel carriage 11 and together with it the point $q$ moves toward the right, the feeler wheel moving along the pattern, the point $q$ reaches $q'$. The point $u$ (the pin 55) determines the movement of the carriage 12 and reaches the position $u'$. Simultaneously the point $t$ moves upwards into the position $t'$ and $s$ moves into the position $s'$, as $qt=q't'$ and $qs=q's'$. If a parallel line to $t's'$ is drawn through $q$ and $qv$ is made equal to $qs$ and $xq$ is made equal to $tq$ and a perpendicular $yz$ is dropped from $y$ upon 48, then $qq'=xt'$, i. e. equal to the distance by which the model wheel carriage has been moved towards the right. The milling cutter carriage 12 has, however, moved farther by the distance $z's'$. The work is thus by this much longer than the pattern. Two similar triangles $xt'q$ and $zyq$ are formed, inasmuch as $xt'$ is parallel to $zy$, thus is $xq:qy=xt':zy$. But $xq=tq$, $qy=qs$ and $xt'=qq'$. Thus follows $tq:qs=qq':zy$. As these ratios remain the same in all positions of 48, an accurately proportional displacement of the carriages 11, 12 in relation to each other takes place, which is determined by adjustment of the link block 51. The adjustment of the link block upon the lever is effected in known manner by means of a scale, the divisions of which enable the extensions or reductions of the last compared with the pattern, which will be produced, to be read off.

A preferred construction of the connection between the lever 48 and the slotted link 54 is clearly shown in Fig. 15, which represents a plan. The lever 48 is bifurcated and receives the link 54 between its arms. The link block 51 is in two parts, one in each arm of the lever and the pin 52 extends between the two link block parts. It will be seen that the transmission of the force takes place in the central plane of the lever.

The drive for the pattern and the work will now be described. The heretofore-known drive for the shaft 5, which rotates the pattern M and the work W, by means of a belt from a pulley fitted upon the pivot of a pivoted swing frame, is incompatible with the parallel sliding movement of the carriage 10. According to the present invention, the drive of the pattern and the wood block to be turned are driven by an endless belt or rope, see Figs. 16, 17 and 18.

Figure 16:
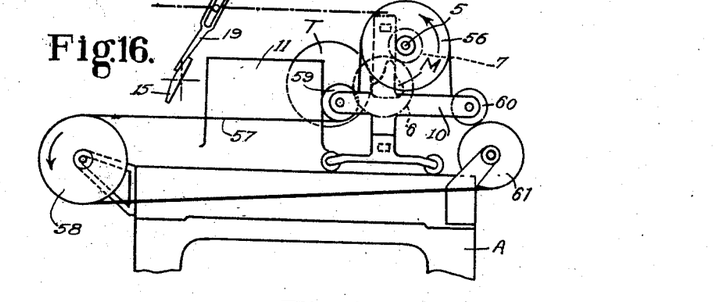
Fig. 16 is a detail of the model drive.

In the first design illustrated in Fig. 16 a pulley 56 is mounted upon the shaft 5 in the slide frame or carriage 10. A belt 57 is conducted from the pulley 58 driven by a back gearing shaft D over a guide roller 59 on the carriage 10; hence over the pulley 56, over a second guide roller 60 on the carriage 10 to a guide 61 mounted upon the frame A and back to the pulley 58. The shaft 5 drives the pattern and the work by the usual toothed gearing.

By this arrangement of the belt an advantageous result is obtained, as follows. When the carriage 10 rolls toward the left, which is the case when the pattern after the passing of an elevation approaches the model wheel, the pulley 56 rolls within the belt 57 and thereby a retardation of the rotation of the pulley 56 is caused, because the rotation of the pulley on the belt caused by the rolling is opposed to the direction of rotation under the action of the driving pulley 58. The jarring of the machine, as the feeler wheel falls into the hollow beyond the elevation, is thus minimized.

Figure 17:
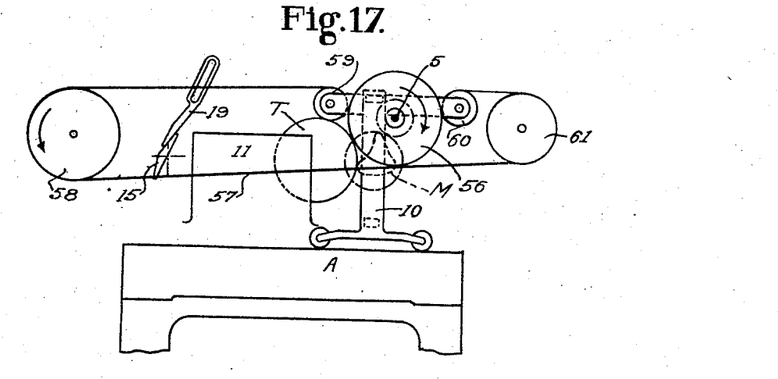
Fig. 17 is a detail of a second form of model drive.

In the construction according to Fig. 17 the same result is obtained for an opposite direction of rotation of the pulley 56 by arranging the rollers 59, 60 on the carriage 10 above the pulley 56.

Figures 18, 19A:
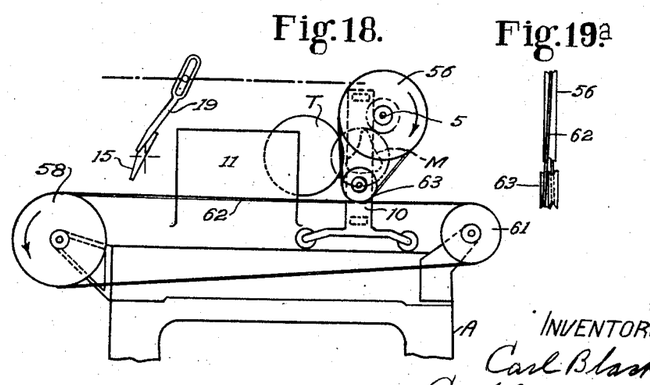

In the third construction illustrated in the Figs. 18 and 19$^a$ the flat belt is replaced by a round belt 62. In this construction a guide pulley 63 with two grooves is mounted upon the carriage 10. The belt is conducted around the driving pulley 58, the guide pulley 63, the pulley 56 and the guide pulley 61 in the manner shown in the Figs. 18 and 19$^a$.

The journaling of the model wheel and the milling cutter will now be described with reference to Figs. 19 to 22.

In hitherto-employed constructions of last copying lathe the shaft of the model wheel and that of the cutter were situated parallel to the axis of rotation of the pattern, see Figs. 19 and 20. Points lying in a cavity are consequently not copied, if the radius of the curvature of this cavity is smaller than the radius of the model wheel which then bridges across the cavity. As the milling cutter head has the same diameter as the model wheel, the cavity is only worked out in the wood block so far as the model wheel extends into the pattern. Cavities of greater curvature must thus be worked out subsequently by hand, which is liable to lead to serious inaccuracies. In the disclosed machine the axis of rotation of the model wheel and the cutter is set crosswise to the axis of rotation of the pattern and the work, in a vertical plane parallel to this axis, in such a manner that their points of contact with the pattern and work remain at the horizontal level of the axis of rotation of the pattern and the wood block. Thus the model wheel is capable of penetrating into cavities of smaller curvature, as its circumference, viewed in the direction of the axis of rotation of the pattern, forms an ellipse the smallest curvature of which is in contact with the pattern. It is thus possible to reproduce deep cavities with a comparatively large and inexpensive model wheel and cutter, and without cutters of very small diameters on axes perpendicular to that of the work, as has been suggested, whereby cutting work is changed into drilling work with the result that the surfaces of the finished last are rendered less smooth.

In the disclosed machine, this cutter axis is tilted about 30° from the horizontal, but the invention is not to be understood as limited to this particular angle.

This novel arrangement of the cutter head axis is not claimed herein, being described and claimed in our parent application above referred to.

In using the machine, the operator will adjust the width grading setting mechanism to the particular model used, and then set the fan-board feeler to the grade desired from that model. He will also set the length grading mechanism and proceed to turn the last in the ordinary manner.

Having thus described our invention, what we claim as new and desire to secure by Letters Patent of the United States is:—

1. In a pattern copying lathe, model wheel and cutter carriages, a model wheel and a cutter on the carriages, respectively, a frame arranged to carry a model and a block, a fan-board and fan-board feeler for effecting width grading movement of one of said members on the carriages, and means for operating the fan-board comprising a rectilinearly moving slide bar actuated by the slide frame and connected to the fan-board.

2. In a pattern copying lathe, model wheel and cutter carriages, a model wheel and cutter on the carriages, respectively, a slide frame arranged to carry a model and a block, a fan-board and a fan-board feeler for effecting width grading movement of one of said members on the carriages, means for operating the fan-board comprising a rectilinearly moving slide bar actuated by the slide frame, and a pin-and-slot connection between the slide bar and the fan-board.

3. In a pattern copying lathe, a frame arranged to carry a model and a block, model wheel and cutter carriages, instrumentalities comprising a model wheel and a cutter mounted on the carriages respectively, one of the said instrumentalities being arranged to slide toward and from the said frame for width grading movement, a fan-board, a fan-board feeler connected with the said sliding member for effecting the said width grading movement; and means for setting the feeler across the fan-board comprising a scale indicating the grades taken from the model and a scale indicating the girth of the model, a lever carrying a pointer arranged to co-operate with said first-named scale, and means for varying the advantage of the lever in accordance with the indications of the said second-named scale.

4. In a pattern copying lathe, two carriages arranged to slide in parallel directions, and a length grading mechanism connecting them comprising a grading lever pivoted on one carriage, a bar connected to the other carriage and to the lever, and a rectilinear guide arranged to hold said bar for rectilinear movement.

5. In a pattern copying lathe, two carriages arranged to slide in parallel directions, and a length grading mechanism connecting them comprising a grading lever pivoted on one carriage, a bar connected to the other carriage and to the lever, a rectilinear guide arranged to hold said bar for rectilinear movement, and a pin-and-slot connection between the grading lever and the bar.

6. In a pattern copying lathe, two carriages arranged to slide in parallel directions, and a length grading mechanism connecting them comprising a grading lever pivoted on one carriage, a bar connected to the other carriage and to the lever, a rectilinear guide arranged to hold said bar for rectilinear movement, the bar having a slot at right angles to its direction of rectilinear movement, and a pin adjustable along the lever and working in the slot.

In testimony whereof we have signed our names to this specification.

CARL BLACK.
CARL BENSCHEIDT, Jr.

Signed in presence of—
FRANCIS J. DUGAN,
LOS S. FRISHAM.